United States Patent
Schmidt et al.

(10) Patent No.: US 7,773,622 B2
(45) Date of Patent: *Aug. 10, 2010

(54) DEFERRED QUEUING IN A BUFFERED SWITCH

(75) Inventors: Steven G. Schmidt, Westampton, NJ (US); Anthony G. Tornetta, King of Prussia, PA (US); Harry V. Paul, Haddonfield, NJ (US); Henry J. Gonzalez, Belle Mead, NJ (US)

(73) Assignee: McData Services Corporation, San Jose, CA (US)

( * ) Notice: Subject to any disclaimer, the term of this patent is extended or adjusted under 35 U.S.C. 154(b) by 1696 days.

This patent is subject to a terminal disclaimer.

(21) Appl. No.: 10/873,430

(22) Filed: Jun. 21, 2004

(65) Prior Publication Data

US 2005/0088970 A1 Apr. 28, 2005

Related U.S. Application Data

(63) Continuation-in-part of application No. 10/020,968, filed on Dec. 19, 2001, now Pat. No. 7,260,104.

(51) Int. Cl.
*H04L 12/56* (2006.01)
(52) U.S. Cl. .................. 370/414; 370/412; 370/231; 370/235; 370/237
(58) Field of Classification Search ......... 370/412–418, 370/395.7, 395.71, 395.72, 231, 235, 237
See application file for complete search history.

(56) References Cited

U.S. PATENT DOCUMENTS 4,710,868 A 12/1987 Cocke et al.

(Continued)

FOREIGN PATENT DOCUMENTS

EP 0 856 969 A1 8/1998

(Continued)

OTHER PUBLICATIONS

Gregory L. Frazier & Yuval Tamir, The Design & Implementation of a Multi-Queue Buffer for VLSI Communication Switches, Proceedings of the International Conference on Computer Design, Oct. 1989, pp. 466-471, IEEE, New York, NY.

(Continued)

*Primary Examiner*—Kwang B Yao
*Assistant Examiner*—Nguyen Ngo
(74) *Attorney, Agent, or Firm*—Wong, Cabello, Lutsch, Rutherford & Brucculeri LLP

(57) ABSTRACT

A method and apparatus is disclosed for temporarily deferring transmission of frames to a destination in a data switch. When a request for transmission of a frame to the destination port is received, the congestion status of that destination is determined. If the destination is congested, the frame is stored in a deferred queue. When the status of a destination changes from congested to non-congested, the deferred queue is examined to see if any deferred frames can now be forwarded to their destination. While examining the deferred queue, incoming frames are placed on a backup queue. When the deferred queue is fully analyzed, the backup queue is emptied by either sending those frames to their destination or storing the frames in the deferred queue. While examining the deferred queue, the congested states of the destinations are not allowed to change from congested to non-congested.

19 Claims, 12 Drawing Sheets

U.S. PATENT DOCUMENTS

| | | | |
|---|---|---|---|
| 4,933,932 A * | 6/1990 | Quinquis et al. | 370/415 |
| 5,455,820 A * | 10/1995 | Yamada | 370/395.71 |
| 5,533,201 A | 7/1996 | Benton et al. | |
| 5,751,969 A * | 5/1998 | Kapoor | 709/235 |
| 5,781,549 A | 7/1998 | Dai | |
| 5,841,773 A * | 11/1998 | Jones | 370/236.1 |
| 5,844,887 A | 12/1998 | Oren et al. | |
| 5,974,467 A | 10/1999 | Haddock et al. | |
| 5,983,260 A | 11/1999 | Hauser et al. | |
| 5,999,527 A | 12/1999 | Petersen | |
| 6,067,286 A | 5/2000 | Jones et al. | |
| 6,144,635 A * | 11/2000 | Nakagawa | 370/229 |
| 6,160,813 A | 12/2000 | Banks et al. | |
| 6,335,992 B1 | 1/2002 | Bala et al. | |
| 6,370,145 B1 | 4/2002 | Dally et al. | |
| 6,388,993 B1 * | 5/2002 | Shin et al. | 370/233 |
| 6,625,121 B1 * | 9/2003 | Lau et al. | 370/230 |
| 6,643,256 B1 * | 11/2003 | Shimojo et al. | 370/229 |
| 6,829,245 B1 * | 12/2004 | Medina et al. | 370/413 |
| 6,940,814 B1 * | 9/2005 | Hoffman | 370/235 |
| 6,967,924 B1 * | 11/2005 | Aimoto | 370/235 |
| 6,992,980 B2 * | 1/2006 | Brezzo et al. | 370/229 |
| 7,120,117 B1 * | 10/2006 | Liu et al. | 370/236 |
| 7,260,104 B2 * | 8/2007 | Schmidt | 370/414 |
| 7,423,967 B2 * | 9/2008 | Tzeng et al. | 370/231 |
| 2002/0110134 A1 * | 8/2002 | Gracon et al. | 370/412 |
| 2002/0156918 A1 | 10/2002 | Valdevit et al. | |
| 2002/0176363 A1 * | 11/2002 | Durinovic-Johri et al. | 370/237 |
| 2003/0026267 A1 | 2/2003 | Oberman et al. | |
| 2003/0202474 A1 | 10/2003 | Kreuzenstein et al. | |
| 2004/0017771 A1 | 1/2004 | Martin et al. | |
| 2004/0024906 A1 | 2/2004 | Valdevit et al. | |
| 2004/0081096 A1 | 4/2004 | Martin | |
| 2006/0098660 A1 * | 5/2006 | Pal et al. | 370/395.51 |

FOREIGN PATENT DOCUMENTS

| | | |
|---|---|---|
| EP | 0 959 591 A1 | 11/1999 |
| EP | 1 016 980 A2 | 7/2000 |
| WO | WO 01/67672 A2 | 9/2001 |
| WO | WO 03/017103 A1 | 2/2003 |
| WO | WO 03/017583 A1 | 2/2003 |

OTHER PUBLICATIONS

Kohei Shiomoto, Masayuki Murata, Yuji Oie and Mideo Miyahaha, Performance Evaluation of Cell Bypass Queuing Discipline for Buffered Banyan Type ATM Switches, Proceedings INFOCOM '90, Feb. 25, 2005, pp. 677-685 vol. 2, IEEE, New York, NY.

Erwin P. Rathgeb, Redundancy Concepts for a Large ATM Switching Node, Sep. 21, 1997, XVI World Telecom Congress Proceedings.

Wolfgang Fischer, Oswald Fundneider, Ernst-Heinrich Goeldner & K.A. Lutz, A Scalable ATM Switching System Architecture, IEEE Journal on Selected Areas in Communications, Oct. 1991, pp. 1299-1307, vol. 9, No. 8, New York, NY.

M. Shreedhar & George Varghese, Efficient Fair Queuing Using Deficit Round-Robin, IEEE/ACM Transactions on Networking, Jun. 1996, pp. 375-385, vol. 4, No. 3.

Providing Reliable, High-Speed Operations in Large Sans, 2002 Brocade Communications Systems, Inc., Mar. 2002.

Kenneth Y. Yun, A Terabit Multiservice Switch, IEEE Micro, Jan.-Feb. 2001, pp. 58-70.

Packet Switch Chips, Feb. 2, 2003, www.lightreading.com/document.asp?doc_id=25989&print=true, Downloaded Feb. 16, 2005.

The Virtual Output Queue, http://ipoint.vlsi.uiuc.edu/abr/virtqueue.html, Downloaded Feb. 16, 2005.

Applied Micro Circuits Corporation, Cyclone (nPX8005) Switch Fabric, https://www.amcc.com/cardiff/docManagement/displayProduct Summary.jsp?prodId=nPX8005, Downloaded Feb. 16, 2005.

* cited by examiner

DEFERRED QUEUING IN A BUFFERED SWITCH

RELATED APPLICATIONS

This application is a continuation-in-part application based on U.S. patent application Ser. No. 10/020,968, entitled "Deferred Queuing in a Buffered Switch," filed on Dec. 19, 2001 now U.S. Pat. No. 7,260,104, which is hereby incorporated by reference.

This application is related to U.S. patent application entitled "Fibre Channel Switch," Ser. No. 10/873,532, filed on Jun. 21, 2004. This related application is hereby incorporated by reference.

FIELD OF THE INVENTION

The present invention relates generally to buffered switches. More particularly, the present invention relates to deferred queuing in a buffered switch to alleviate head of line blocking in the buffered switch.

BACKGROUND OF THE INVENTION

Communication switches are often used in information networks to transfer information between devices within the network. These switches can have as few as four ports or as many as thousands of ports. Each input port generally requires some amount of buffer space to store frames or packets of information prior to the frames or packets being forwarded to an output port.

One problem associated with buffered switches is head of line blocking. Head of line blocking occurs in switches that have a single receive buffer at each ingress port. When multiple packets or frames of data are queued up (in line) for transmission through a central switch and the destination of the packets or frame at the front of the queue (head of line) is not available for reception, the queue is defined as "head of line blocked." This is because, not only is that packet or frame blocked, all packets or frames behind the blocked packet or frame in the queue are blocked even though their destination may be available. Thus, all packets or frames are blocked until the packet or frame at the head of the queue is transmitted.

One way to solve head of line blocking is to provide one receive buffer at each of the switch's ingress ports for every egress port. For small switches, this approach may be feasible. However for very large switches, massive amounts of memory must be used to provide buffering for all of the outputs. If the switch requires a large input buffer due to long haul applications, the problem is exacerbated further. Accordingly, it is desirable to provide a method and apparatus for alleviating the problems associated with head of line blocking in a buffered switch without using separate buffers for every output.

SUMMARY OF THE INVENTION

The present invention overcomes the problems cited above by temporarily ignoring the blocked packets or frames and deferring their transmission until the destination is ready for reception. This approach does not require any additional memory for frame storage but does require a small amount of memory for frame headers.

The present invention utilizes a cell credit manager to determine the congestion status of the destinations within a switch. When there is a change in this status for a destination, the cell credit manager creates an XOFF/XON event. An XOFF mask at each port receives these events and uses them to record the congestions status for every destination in the switch. An XOFF status indicates that destination is not accepting data transfers, and is synonymous with the destination being congested, busy, or unavailable. An XON status indicates that the destination is accepting data transfers, and is synonymous with the destination being ready, available, or non-congested.

The present invention recognizes that the XOFF mask should not set the status of the destination port to XON during certain portions of the deferred queuing procedure. Consequently, the present invention utilizes a XON history register that also tracks the current status of all ports. This XON history register receives the XOFF signals from the cell credit manager and reflects those changes in its own lookup table. The values in the look up table in the XON history register are then used to periodically update the values in the look up table in the XOFF mask.

The present invention also recognizes flow control signals directly from the memory subsystem that request that all data stop flowing to that subsystem. When these signals are receives, a "gross_xoff" signal is sent to the XOFF mask. The XOFF mask is then able to combine the results of this signal with the status of every destination port as maintained in its lookup table. When another portion of the switch wishes to determine the status of a particular port, the internal switch destination address is submitted to the XOFF mask. This address is used to reference the status of that destination in the lookup table, and the result is ORed with the value of the gross_xoff signal. The resulting signal indicates the status of the indicated destination port.

The present invention uses the status in the XOFF mask to effectively defer that transmission of data packets or frames that are destined for a congested port. In its initial state, incoming data packets are compared to the XOFF mask. If the destination is not congested, the packet is immediately submitted to the crossbar fabric. If the destination is congested, the packet is placed in the deferred queue.

The queue module remains in the initial state until the XOFF mask changes the status of a port from XOFF to XON. At this point, the queue module enters the deferred state. In this state, the queue module goes through all of the packet headers in the queue module and compares the destination of each packet with the current value in the XOFF mask. If the destination is not congested, the packet is submitted to the crossbar fabric. If the destination is still congested, the packet is added back to the deferred queue. If the status of a port changes during the deferred state from XON to XOFF, that change is immediately reflected in the XOFF mask. If the status changes during the deferred state from XOFF to XON, that change is made to the XON history register, but not immediately to the XOFF mask. The examination of every header in the deferred queue continues with the old status values in the XOFF mask. When this is completed, the values in the XON history register are applied to the XOFF mask, and the examination of all headers in the deferred queue is begun again.

Any packets received at the port while the queue module is in the deferred state are stored in the backup header. When the deferred state has finished examining all headers in the deferred queue, the status of the backup queue is checked. If the backup queue is empty, the queue module returns to the initial state. If the backup queue is not empty, the queue module enters the backup state. During this state, the entries in the backup queue are examined and their destinations are compared with the XOFF mask. If the destination is not congested, the packet will be sent to the crossbar. If the destination is congested, the packet will be placed in the deferred queue. If there is a change in the congestion status of a destination to an XON state, the queue module will immediately enter the deferred mode. If the queue module in backup mode completely empties the backup queue without a change in destination status to XON, the queue module returns to the initial mode.

If a gross_xoff signal is received, the queue module enters the gross_xoff state, during which all data received over the port is placed in the backup queue. When the gross_xoff signal is no longer set, the queue module enters the deferred mode (if an XON has been received), the backup mode (if the backup queue is not empty), or returns back to the initial mode.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

1. Switch 100

Figure 1:
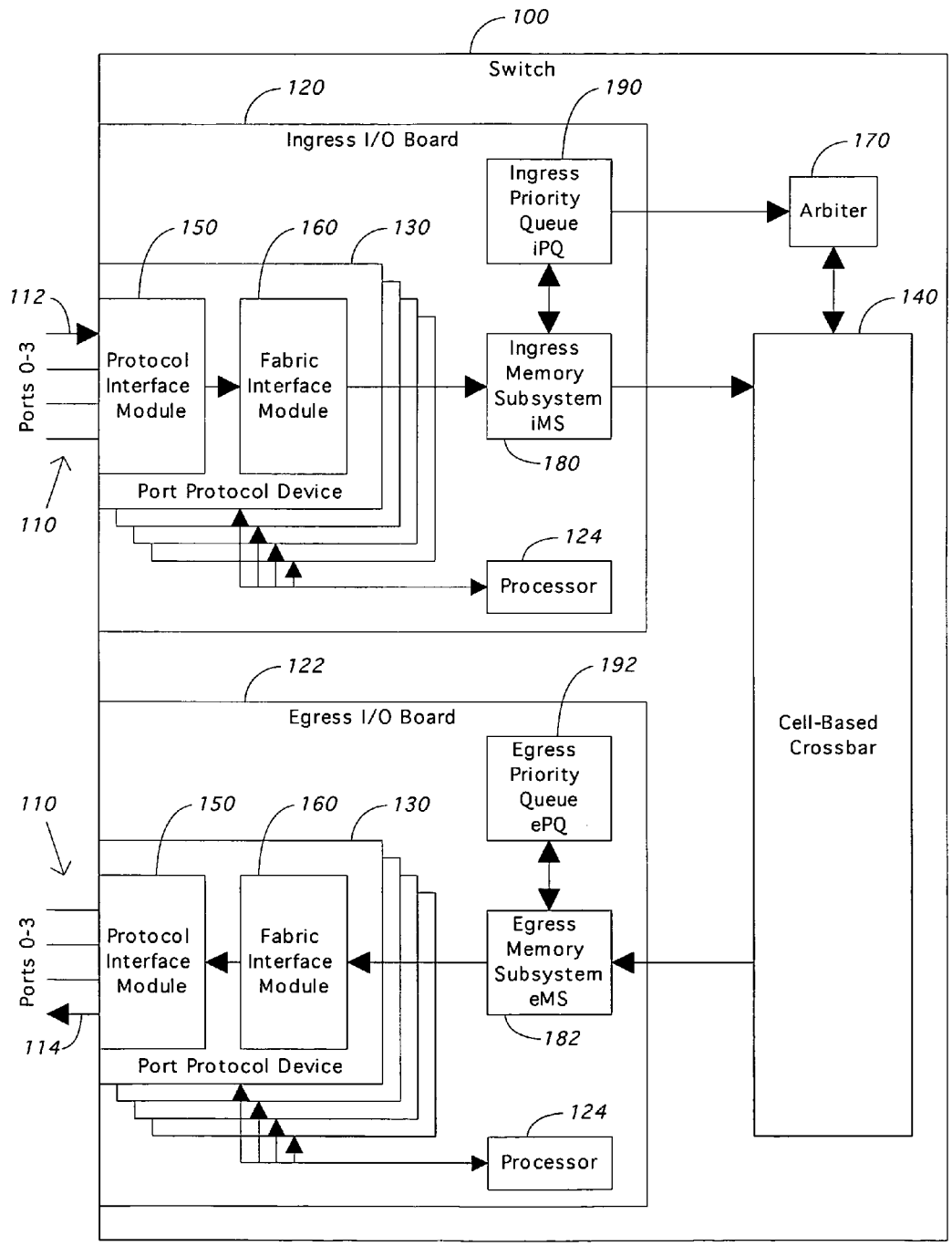
FIG. 1 is a block diagram of one possible Fibre Channel switch in which the present invention can be utilized.

The present invention is best understood after examining the major components of a Fibre Channel switch, such as switch 100 shown in FIG. 1. The components shown in FIG. 1 are helpful in understanding the applicant's preferred embodiment, but persons of ordinary skill will understand that the present invention can be incorporated in switches of different construction, configuration, or port counts.

Switch 100 is a director class Fibre Channel switch having a plurality of Fibre Channel ports 110. The ports 110 are physically located on one or more I/O boards inside of switch 100. Although FIG. 1 shows only two I/O boards, namely ingress board 120 and egress board 122, a director class switch 100 would contain eight or more such boards. The preferred embodiment described in the application can contain thirty-two such I/O boards 120, 122. Each board 120, 122 contains a microprocessor 124 that, along with its RAM and flash memory (not shown), is responsible for controlling and monitoring the other components on the boards 120, 122 and for handling communication between the boards 120, 122.

In the preferred embodiment, each board 120, 122 also contains four port protocol devices (or PPDs) 130. These PPDs 130 can take a variety of known forms, including an ASIC, an FPGA, a daughter card, or even a plurality of chips found directly on the boards 120, 122. In the preferred embodiment, the PPDs 130 are ASICs, and can be referred to as the FCP ASICs, since they are primarily designed to handle Fibre Channel protocol data. Each PPD 130 manages and controls four ports 110. This means that each I/O board 120, 122 in the preferred embodiment contains sixteen Fibre Channel ports 110.

The I/O boards 120, 122 are connected to one or more crossbars 140 designed to establish a switched communication path between two ports 110. Although only a single crossbar 140 is shown, the preferred embodiment uses four or more crossbar devices 140 working together. In the preferred embodiment, crossbar 140 is cell-based, meaning that it is designed to switch small, fixed-size cells of data. This is true even though the overall switch 100 is designed to switch variable length Fibre Channel frames.

The Fibre Channel frames are received on a port, such as input port 112, and are processed by the port protocol device 130 connected to that port 112. The PPD 130 contains two major logical sections, namely a protocol interface module 150 and a fabric interface module 160. The protocol interface module 150 receives Fibre Channel frames from the ports 110 and stores them in temporary buffer memory. The protocol interface module 150 also examines the frame header for its destination ID and determines the appropriate output or egress port 114 for that frame. The frames are then submitted to the fabric interface module 160, which segments the variable-length Fibre Channel frames into fixed-length cells acceptable to crossbar 140.

The fabric interface module 160 then transmits the cells to an ingress memory subsystem (iMS) 180. A single iMS 180 handles all frames received on the I/O board 120, regardless of the port 110 or PPD 130 on which the frame was received.

When the ingress memory subsystem 180 receives the cells that make up a particular Fibre Channel frame, it treats that collection of cells as a variable length packet. The iMS 180 assigns this packet a packet ID (or "PID") that indicates the cell buffer address in the iMS 180 where the packet is stored. The PID and the packet length is then passed on to the ingress Priority Queue (iPQ) 190, which organizes the packets in iMS 180 into one or more queues, and submits those packets to crossbar 140. Before submitting a packet to crossbar 140, the iPQ 190 submits a "bid" to arbiter 170. When the arbiter 170 receives the bid, it configures the appropriate connection through crossbar 140, and then grants access to that connection to the iPQ 190. The packet length is used to ensure that the connection is maintained until the entire packet has been transmitted through the crossbar 140, although the connection can be terminated early.

A single arbiter 170 can manage four different crossbars 140. The arbiter 170 handles multiple simultaneous bids from all iPQs 190 in the switch 100, and can grant multiple simultaneous connections through crossbar 140. The arbiter 170 also handles conflicting bids, ensuring that no output port 114 receives data from more than one input port 112 at a time.

The output or egress memory subsystem (eMS) 182 receives the data cells comprising the packet from the crossbar 140, and passes a packet ID to an egress priority queue (ePQ) 192. The egress priority queue 192 provides scheduling, traffic management, and queuing for communication between egress memory subsystem 182 and the PPD 130 in egress I/O board 122. When directed to do so by the ePQ 192, the eMS 182 transmits the cells comprising the Fibre Channel frame to the egress portion of PPD 130. The fabric interface module 160 then reassembles the data cells and presents the resulting Fibre Channel frame to the protocol interface module 150. The protocol interface module 150 stores the frame in its buffer, and then outputs the frame through output port 114.

In the preferred embodiment, crossbar 140 and the related components are part of a commercially available cell-based switch chipset, such as the nPX8005 or "Cyclone" switch fabric manufactured by Applied Micro Circuits Corporation of San Diego, Calif. More particularly, in the preferred embodiment, the crossbar 140 is the AMCC S8705 Crossbar product, the arbiter 170 is the AMCC S8605 Arbiter, the iPQ 190 and ePQ 192 are AMCC S8505 Priority Queues, and the iMS 180 and eMS 182 are AMCC S8905 Memory Subsystems, all manufactured by Applied Micro Circuits Corporation.

2. Port Protocol Device 130 a) Link Controller Module 300

Figure 2:
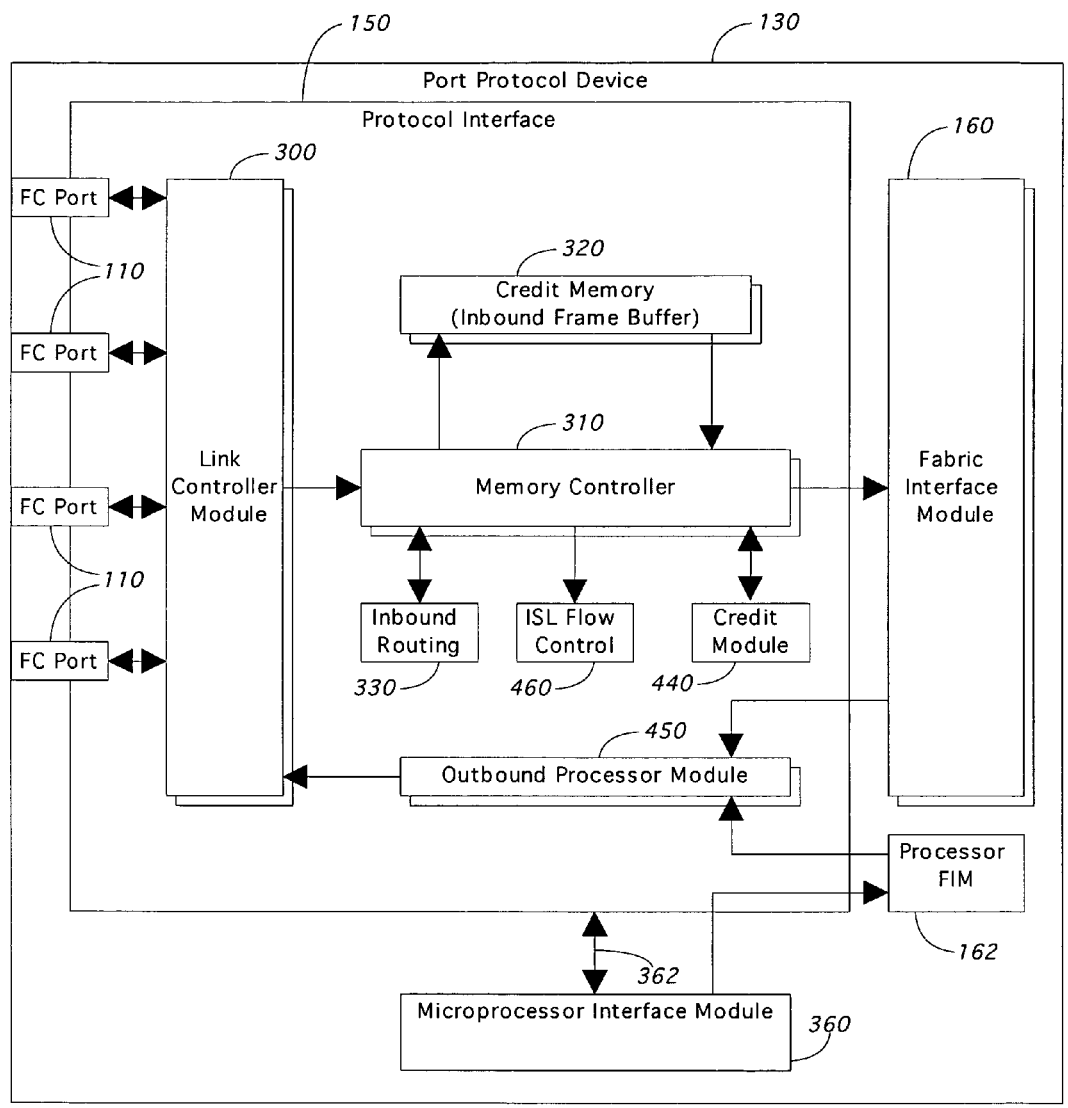
FIG. 2 is a block diagram showing the details of the port protocol device of the Fibre Channel switch shown in FIG. 1.

FIG. 2 shows the components of one of the four port protocol devices 130 found on each of the I/O Boards 120, 122. As explained above, incoming Fibre Channel frames are received over a port 110 by the protocol interface 150. A link controller module (LCM) 300 in the protocol interface 150 receives the Fibre Channel frames and submits them to the memory controller module 310. One of the primary jobs of the link controller module 300 is to compress the start of frame (SOF) and end of frame (EOF) codes found in each Fibre Channel frame. By compressing these codes, space is created for status and routing information that must be transmitted along with the data within the switch 100. More specifically, as each frame passes through PPD 130, the PPD 130 generates information about the frame's port speed, its priority value, the internal switch destination address (or SDA) for the source port 112 and the destination port 114, and various error indicators. This information is added to the SOF and EOF in the space made by the LCM 300. This "extended header" stays with the frame as it traverses through the switch 100, and is replaced with the original SOF and EOF as the frame leaves the switch 100.

The LCM 300 uses a SERDES chip (such as the Gigablaze SERDES available from LSI Logic Corporation, Milpitas, Calif.) to convert between the serial data used by the port 110 and the 10-bit parallel data used in the rest of the protocol interface 150. The LCM 300 performs all low-level link-related functions, including clock conversion, idle detection and removal, and link synchronization. The LCM 300 also performs arbitrated loop functions, checks frame CRC and length, and counts errors.

b) Memory Controller Module 310

The memory controller module 310 is responsible for storing the incoming data frame on the inbound frame buffer memory 320. Each port 110 on the PPD 130 is allocated a separate portion of the buffer 320. Alternatively, each port 110 could be given a separate physical buffer 320. This buffer 320 is also known as the credit memory, since the BB_Credit flow control between switch 100 and the upstream device is based upon the size or credits of this memory 320. The memory controller 310 identifies new Fibre Channel frames arriving in credit memory 320, and shares the frame's destination ID and its location in credit memory 320 with the inbound routing module 330.

The routing module 330 of the present invention examines the destination ID found in the frame header of the frames and determines the switch destination address (SDA) in switch 100 for the appropriate destination port 114. The router 330 is also capable of routing frames to the SDA associated with one of the microprocessors 124 in switch 100. In the preferred embodiment, the SDA is a ten-bit address that uniquely identifies every port 110 and processor 124 in switch 100. A single routing module 330 handles all of the routing for the PPD 130. The routing module 330 then provides the routing information to the memory controller 310.

Figure 3:
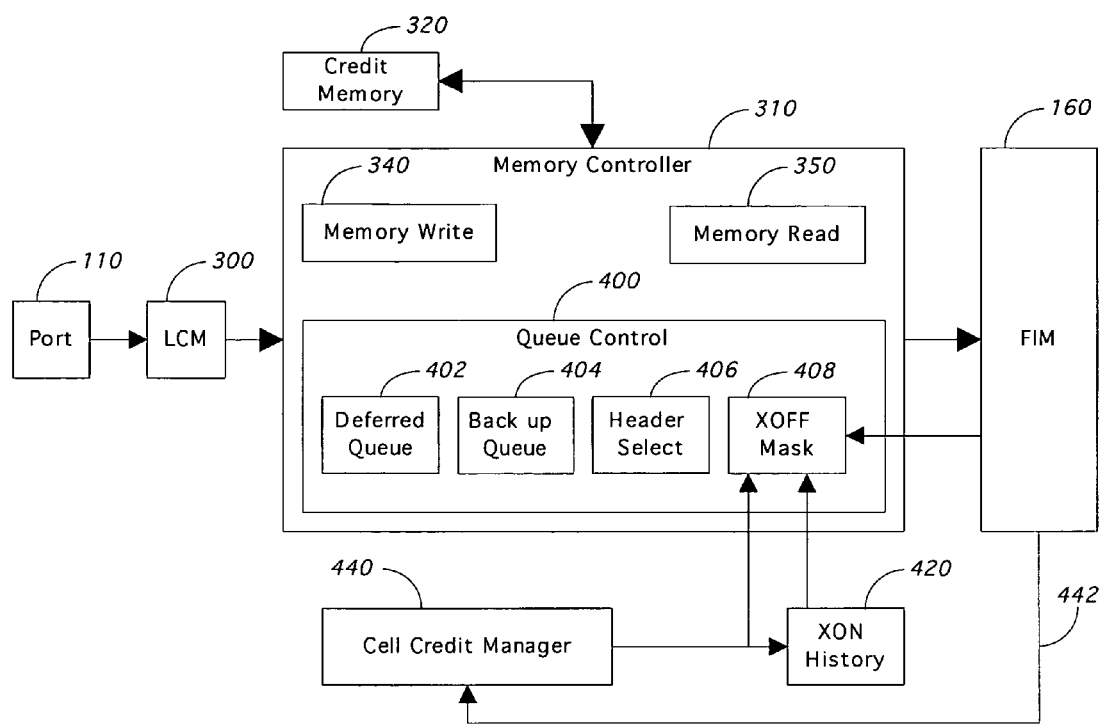
FIG. 3 is a block diagram showing the details of the memory controller of the port protocol device shown in FIG. 2.

As shown in FIG. 3, the memory controller 310 consists of a memory write module 340, a memory read module 350, and a queue control module 400. A separate memory controller 310 exists for each of the four ports 110 on the PPD 130. The memory write module 340 handles all aspects of writing data to the credit memory 320. The memory read module 350 is responsible for reading the data frames out of memory 320 and providing the frame to the fabric interface module 160. The queue control module 400 handles the queuing and ordering of data on the credit memory 320. The XON history register 420 can also be considered a part of the memory controller 310, although only a single XON history register 420 is needed to service all four ports 110 on a PPD 130.

c) Queue Control Module 400

The queue control module 400 stores the routing results received from the inbound routing module 330. When the credit memory 320 contains multiple frames, the queue control module 400 decides which frame should leave the memory 320 next. In doing so, the queue module 400 utilizes procedures that avoid head-of-line blocking.

The queue control module 400 has four primary components, namely the deferred queue 402, the backup queue 404, the header select logic 406, and the XOFF mask 408. These components work in conjunction with the XON History register 420 and the cell credit manager or credit module 440 to control ingress queuing and to assist in managing flow control within switch 100. The deferred queue 402 stores the frame headers and locations in buffer memory 320 for frames waiting to be sent to a destination port 114 that is currently busy. The backup queue 404 stores the frame headers and buffer locations for frames that arrive at the input port 112 while the deferred queue 402 is sending deferred frames to their destination. The header select logic 406 determines the state of the queue control module 400, and uses this determination to select the next frame in credit memory 320 to be submitted to the FIM 160. To do this, the header select logic 406 supplies to the memory read module 350 a valid buffer address containing the next frame to be sent. The XOFF mask 408 contains a congestion status bit for each port 110 in the switch. The XON history register 420 is used to delay updating the XOFF mask 408 under certain conditions. The interaction between the queue control module 400, the XOFF mask 408, the XON history register 420, and the cell credit manager 440 are described in more detail below.

d) Fabric Interface Module

When a Fibre Channel frame is ready to be submitted to the ingress memory subsystem 180 of I/O board 120, the queue control 400 passes the frame's routed header and pointer to the memory read portion 350. This read module 350 then takes the frame from the credit memory 320 and provides it to the fabric interface module 160. The fabric interface module 160 converts the variable-length Fibre Channel frames received from the protocol interface 150 into fixed-sized data cells acceptable to the cell-based crossbar 140. Each cell is constructed with a specially configured cell header appropriate to the cell-based switch fabric. When using the Cyclone switch fabric of Applied Micro Circuits Corporation, the cell header includes a starting sync character, the switch destination address of the egress port 114 and a priority assignment from the inbound routing module 330, a flow control field and ready bit, an ingress class of service assignment, a packet length field, and a start-of-packet and end-of-packet identifier.

When necessary, the preferred embodiment of the fabric interface 160 creates fill data to compensate for the speed difference between the memory controller 310 output data rate and the ingress data rate of the cell-based crossbar 140. This process is described in the incorporated Fibre Channel Switch application.

Egress data cells are received from the crossbar 140 and stored in the egress memory subsystem 182. When these cells leave the eMS 182, they enter the egress portion of the fabric interface module 160. The FIM 160 then examines the cell headers, removes fill data, and concatenates the cell payloads to re-construct Fibre Channel frames with extended SOF/EOF codes. If necessary, the FIM 160 uses a small buffer to smooth gaps within frames caused by cell header and fill data removal.

In the preferred embodiment, there are multiple links between each PPD 130 and the iMS 180. Each separate link uses a separate FIM 160. Preferably, each port 110 on the PPD 130 is given a separate link to the iMS 180, and therefore each port 110 is assigned a separate FIM 160.

e) Outbound Processor Module 450

The FIM 160 then submits the frames to the outbound processor module (OPM) 450. A separate OPM 450 is used for each port 110 on the PPD 130. The outbound processor module 450 checks each frame's CRC, and handles the necessary buffering between the fabric interface 160 and the ports 110 to account for their different data transfer rates. The primary job of the outbound processor modules 450 is to handle data frames received from the cell-based crossbar 140 that are destined for one of the Fibre Channel ports 110. This data is submitted to the link controller module 300, which replaces the extended SOF/EOF codes with standard Fibre Channel SOF/EOF characters, performs $8b/10b$ encoding, and sends data frames through its SERDES to the Fibre Channel port 110.

The components of the PPD 130 can communicate with the microprocessor 124 on the I/O board 120, 122 through the microprocessor interface module (MIM) 360. Through the microprocessor interface 360, the microprocessor 124 can read and write registers on the PPD 130 and receive interrupts from the PPDs 130. This communication occurs over a microprocessor communication path 362. The microprocessor 124 also uses the microprocessor interface 360 to communicate with the ports 110 and with other processors 124 over the cell-based switch fabric.

3. Congestion Notification a) XOFF Mask 408

Figure 4:
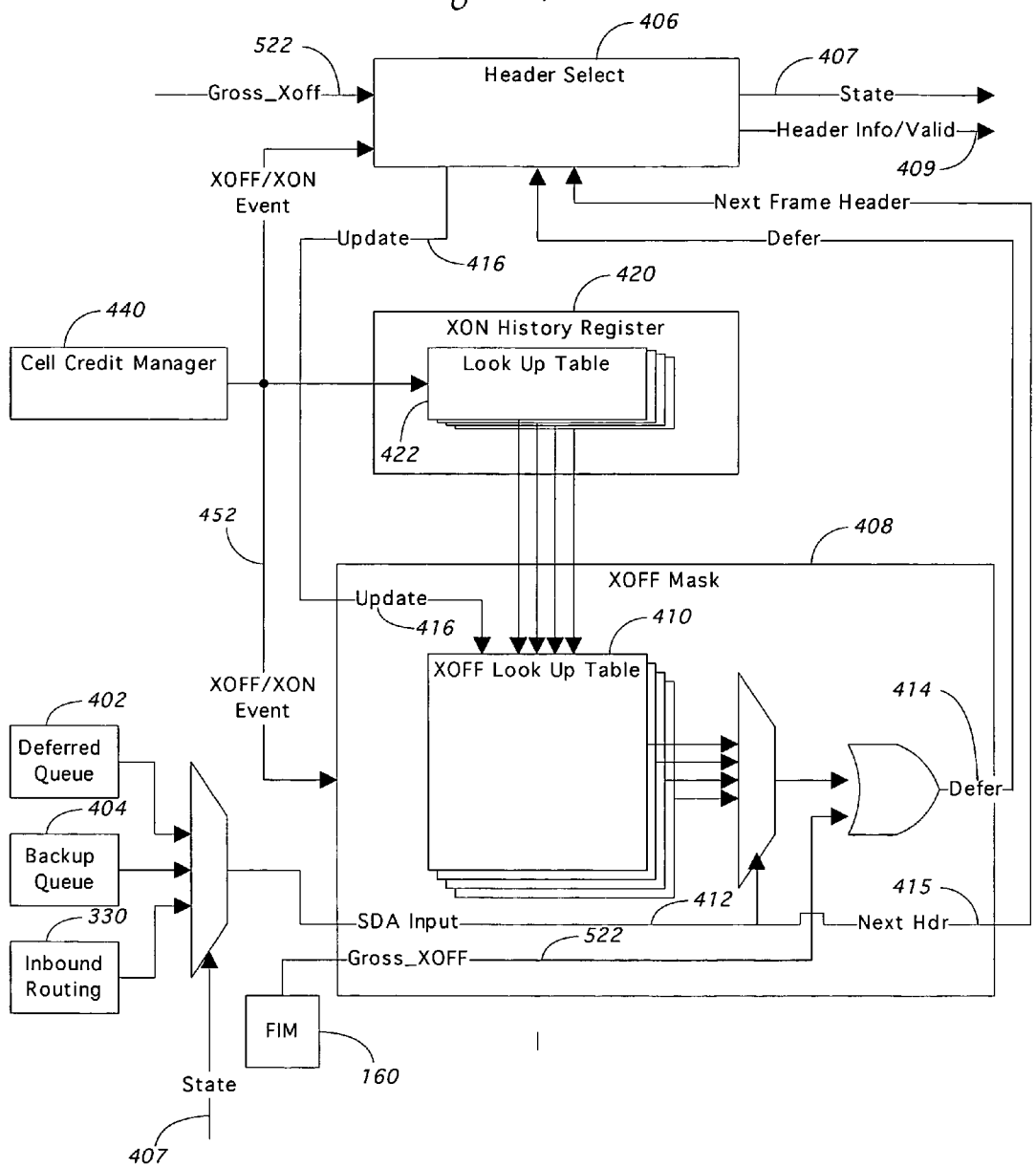
FIG. 4 is a block diagram showing the interactions of the XOFF mask, the XON history register, and the header select component of the queue control module shown in FIG. 3.

The XOFF mask 408, shown in FIGS. 3 and 4, is responsible for notifying the queue control module 400 of the congestion status of all ports 110 and microprocessors 124 in the switch. Every port 110 has its own queue controller module 400, and hence has its own XOFF mask 408. Each XOFF mask 408 contains a separate status bit for all destinations within the switch 100. In one embodiment of the switch 100, there are five hundred and twelve physical ports 110 and thirty-two microprocessors 124 that can serve as a destination for a frame. Hence, the XOFF mask 408 uses a 544 by 1 look up table 410 to store the "XOFF" status of each destination. If a bit in XOFF look up table 410 is set, the port 110 corresponding to that bit is busy and cannot receive any frames.

In the preferred embodiment, the XOFF mask 408 returns a status for a destination by first receiving the switch destination address for that port 110 or microprocessor 124 on SDA input 412. The SDA input 412 contains the switch destination address that is selected from the deferred queue 402, the backup queue 404, or the most recently received frame being analyzed by the inbound routing module 330. The selection of the appropriate address for the XOFF mask 408 is made according the current "state" 407 of the machine as determined by the header select logic 406. The selected address is made available to the rest of the queue control module through next frame header output 415.

The look up table 410 is examined for the SDA on input 412, and if the corresponding bit is set, the XOFF mask 408 asserts a signal on "defer" output 414, which indicates to the rest of the queue control module 400 that the selected port 110 or processor 124 is busy. In the preferred embodiment, the output of the XOFF look up table 410 is not the sole source for the defer signal 414. In addition, the XOFF mask 408 receives the gross_xoff signal 522 from its associated FIM 160. This signal 522 is ORed with the output of the lookup table 410 in order to generate the defer signal 414. This means that whenever the gross_xoff signal 522 is set, the defer signal 414 will also be set, effectively stopping all traffic to the iMS 180. In another embodiment (not shown), a force defer signal that is controlled by the microprocessor 124 is also able to cause the defer signal 414 to go on. When the defer signal 414 is set, it informs the header select logic 406 and the remaining elements of the queue module 400 that the port 110 having the address on next frame header output 415 is congested, and this frame should be stored on the deferred queue 402.

b) XOFF History Register 420

The XON history register 420 is used to record the history of the XON status of all destinations in the switch 100. Under the procedure described below for deferred queuing, the XOFF mask 408 cannot be updated with an XON event when the queue control 400 is servicing deferred frames in the deferred queue 402. During that time, whenever a port 110 changes status from XOFF to XON, the XOFF mask 408 will ignore (or not receive) the XOFF signal 452 from the cell credit manager 440 and will therefore not update its lookup table 410. The signal 452 from the cell credit manager 440 will, however, update the lookup table 422 within the XON history register 420. Thus, the XON history register 420 maintains the current XON status of all ports 110. When the update signal 416 is made active by the header select 406 portion of the queue control module 400, the entire content of the lookup table 422 in the XON history register 420 is transferred to the lookup table 410 of the XOFF mask 408. Registers within the table 422 containing a zero (having a status of XON) will cause corresponding registers within the XOFF mask lookup table 410 to be reset to zero. The dual register setup allows for XOFFs to be written directly to the XOFF mask 408 at any time the cell credit manager 440 requires traffic to be halted, and causes XONs to be applied only when the logic within the queue control module 400 allows for a change to an XON value. While a separate queue control module 400 and its associated XOFF mask 408 is necessary for each port 110 in the PPD 130, only one XON history register 420 is necessary to service all four ports 110 in the PPD 130.

c) Cell Credit Manager 440

The cell credit manager or credit module 440 sets the XOFF/XON status of the possible destination ports 110 in the lookup tables 410, 422 of the XOFF mask 408 and the XON history register 420. To update these tables 410, 422, the cell credit manager 440 maintains a cell credit count of every cell in the iMS 180. Every time a cell addressed to a particular SDA enters and leaves the iMS 180, the credit module 440 is informed by one of the FIMs 160. The cell credit manager 440 maintains separate credit counts for each SDA, with each count reflecting the number of cells contained within the iMS 180 for a given SDA. When one of these counts crosses a threshold value, the cell credit manager 440 causes a driver to send the appropriate XOFF or XON event 452 to the XOFF mask 408, the XON history register 420, and the header select logic 406. In the preferred embodiment, the XOFF event 452 is a three-part signal identifying the SDA, the new XOFF status, and a validity signal. If the count gets too low, then that SDA is XOFFed. This means that frame headers for that destination will be stored in the deferred queue 402 and the data will be held in the credit memory 320. After the SDA is XOFFed, the credit module 440 waits for the count for that SDA to rise to a certain level, and then the SDA is XONed. This allows the deferred queue 402 to send frames to that destination. The XOFF and XON thresholds can be different for each individual SDA, and are programmable by the processor 124.

Because each cell credit manager 440 is directly connected to only to a portion of the FIMs 160 exchanging data with switch fabric, the preferred embodiment uses a master cell credit manager 440 to collect cell counts from all FIMs 160. Each of the other cell credit managers 440 are considered slave units. These units 440 forward each change for the cell counts to the master unit, which maintains the credit counts for the entire I/O board 120/122. The master unit then informs all of the other cell credit managers 440 on its board when it is necessary to send out an XOFF or XON event 452.

4. Deferred Queue 402

Figure 5:
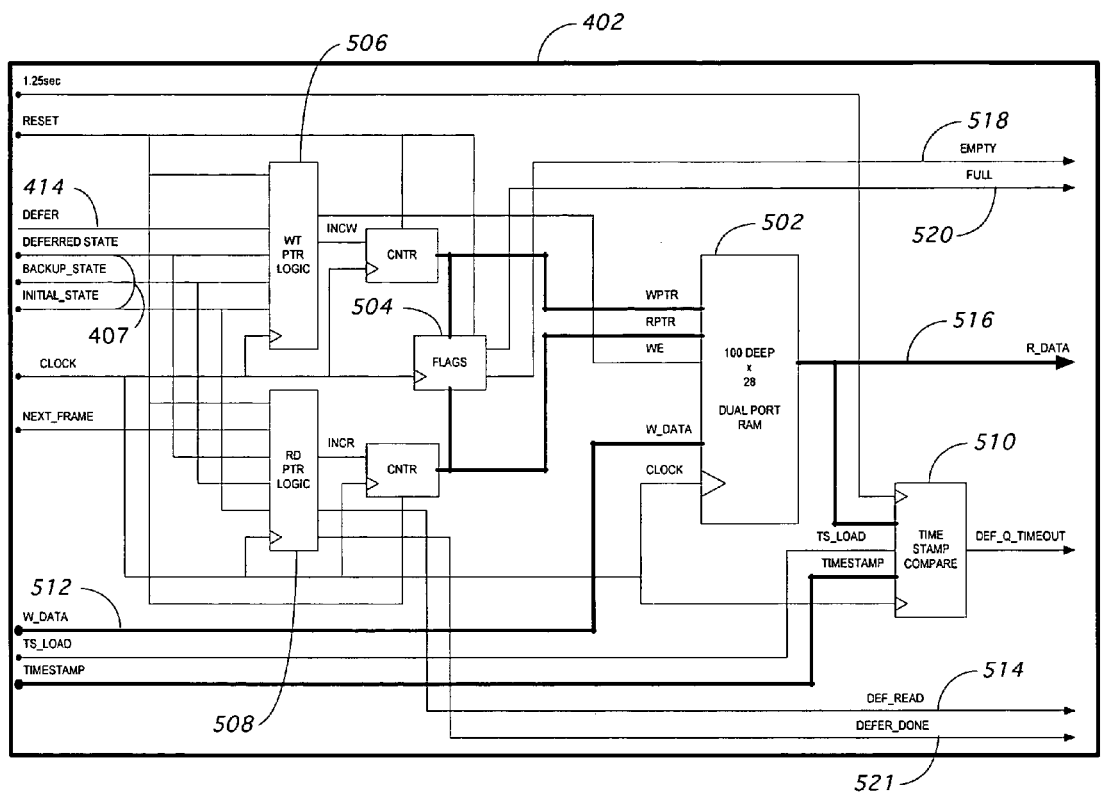
FIG. 5 is a block diagram showing the components of the deferred queue of the queue control module shown in FIG. 3.

As seen in FIG. 5, the deferred queue 402 is comprised of five major components, a dual port memory 502, a flag register 504, the write pointer logic 506 and its associated counter, the read pointer logic 508 and its associated counter, and time stamp logic 510. The dual port memory 502 stores header information and an address pointer that indicates where a frame is stored in credit memory 320. In the preferred embodiment, the dual port memory 502 is a 128×32 dual port RAM. Other configurations would clearly be within the scope of the present invention. The flag register 504 is used for error status.

The write pointer logic 506 determines when the dual port memory 502 should be written based on the state 407 of the queue control module 400 and the defer signal 414 that originates from the XOFF mask 408. The state 407 can be determined by examining the deferred_state, backup_state, and initial_state inputs shown in FIG. 5, which collectively are referred to as the state signal 407. The write pointer logic 506 will cause the data found on the write data input (w_data) 512 to be written to the dual port memory 502 at the next available location. This write data 512 is received from the next frame header output 415 of the XOFF mask 408. The following header information is stored in the dual port memory 502 for each frame in the deferred queue 402: a routing reason code (assigned by the inbound routing module 330); a switch destination address (assigned by IRM 330), and a priority value (assigned by IRM 330; the location of the frame in the credit memory 320; and the time stamp value indicating when the frame was submitted to the deferred queue 402.

The read pointer logic 508 determines when the dual port memory 502 should be read based on the state 407 of the queue control module 400. Assuming that it is appropriate to read data from the deferred queue 402, the def_read signal 514 will be set, and the r_data output 516 will contain the frame header information for the next frame in the deferred queue 402.

This set up allows the deferred queue 402 to automatically write to its dual port memory 502 the header information for any frame that is deferred by the XOFF mask 408. This is true even then queue control module 400 is in the deferred state, and that header information is originating from the deferred queue 402 itself out of the r_data output 516.

The time stamp compare logic 510 is used to determine if a queue entry has gone "stale". Whenever a frame is deferred, four bits of the time stamp (contained in the SOF) are written into the deferred queue 402. The time stamp compare logic 510 contains a current copy of those same four bits. The oldest entry in the dual port memory 502 is always kept available at the output. The stored time stamp is continuously compared to the current time stamp. If the difference ever becomes greater than two seconds, a timeout signal is sent to the microprocessor 124.

In addition to the def_read signal 514 and the r_data output 516, the deferred queue 402 is able to signal when it is empty 518 or full 520. In addition, the deferred queue 402 can signal on its defer_done output 521 when it has finished the process of examining all headers in its dual port memory 502.

5. Backup Queue 404

Figure 6:
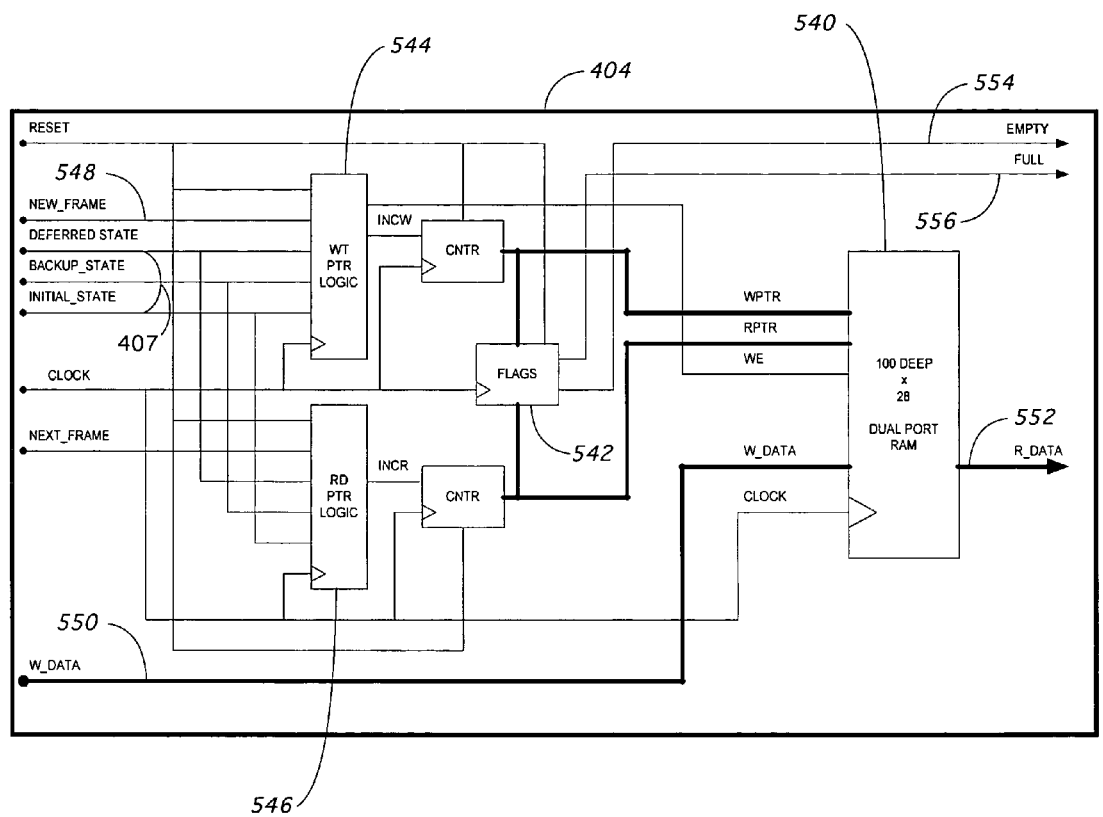
FIG. 6 is a block diagram showing the components of the backup queue of the queue control module shown in FIG. 3.

The backup queue 404 shown in FIG. 6 is comprised of four major components, a dual port memory 540, a flag register 542, the write pointer logic 544 and its associated counter, and the read pointer logic 546 and its associated counter. Like the memory 502 in the deferred queue 402, the dual port memory 540 in the backup queue 404 stores header information and an address pointer that indicates where a frame is stored in credit memory 320. The flag register 542 is used for error status.

The write pointer logic 544 determines when the dual port should be written based on the state 407 of the queue control module 400 and the new_frame signal 548. The inbound routing module 330 asserts the new_frame 548 signal to indicate that valid heading information is being presented to the backup queue 404 on its w_data input 550.

The read pointer logic 546 uses the state 407 of the queue control module 400 to determine when the dual port memory 540 should be read. The information read from the memory 540 is presented on the r_data output 552. The backup queue 404 is also able to inform the rest of queue control module 400 when it is empty 554 or full 556.

6. Header Select

Figure 7:
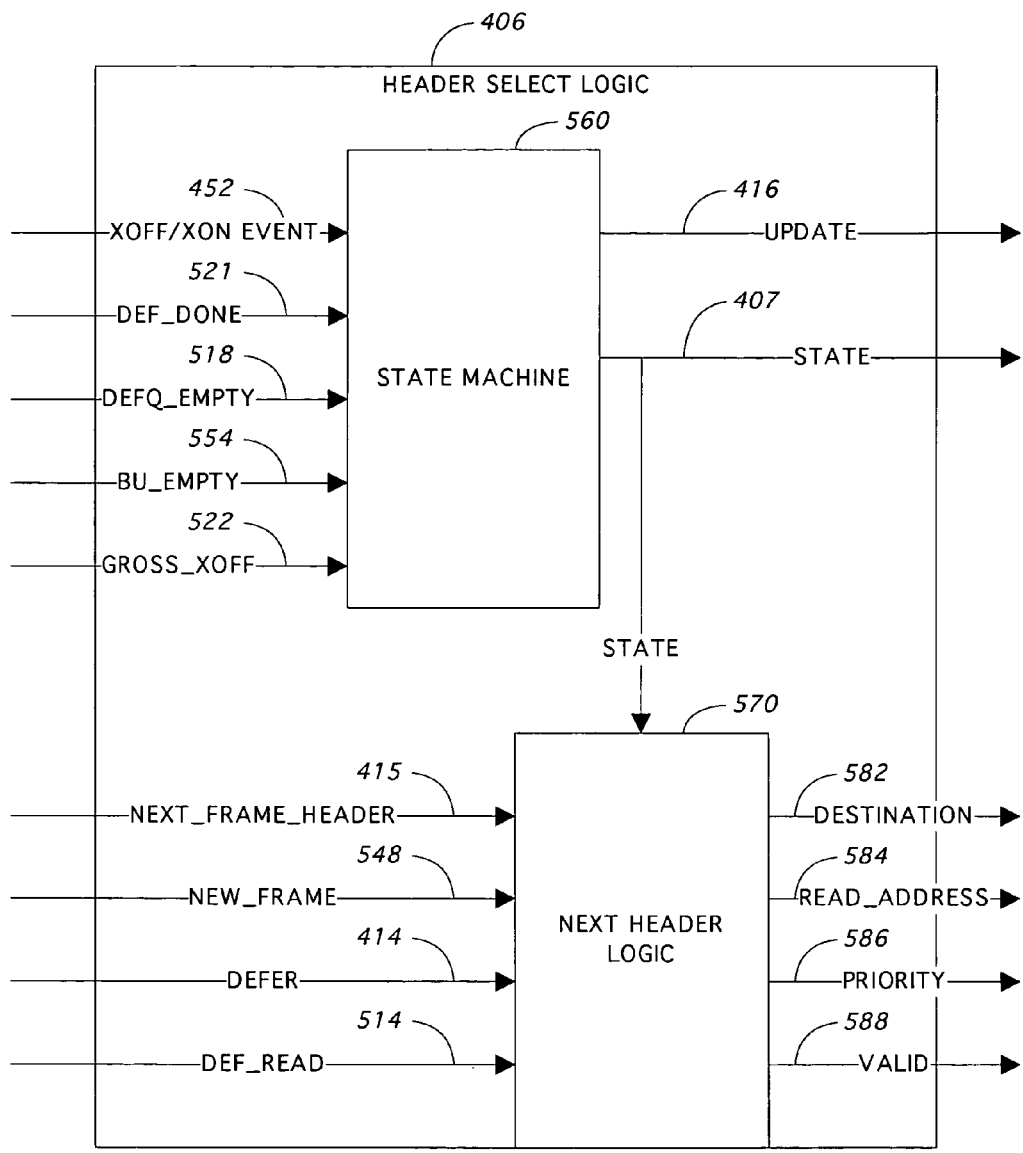
FIG. 7 is a block diagram showing the components of the header select logic of the queue control module shown in FIG. 3.

As shown in FIG. 7, the header select logic 406 contains the deferred queue state machine 560 and the next header logic 570. The state machine 560 is responsible for controlling the operation of the entire queue control module 400 and its associated components. The state machine 560 monitors XOFF/XON events 452 from the cell credit manager 440, the done signal 521 and the empty signal 518 from the deferred queue 402, the empty signal 554 from the backup queue 404, and the gross_xoff signal 522 to determine the current state 407 of the queue control module 400. As can be seen in the state diagram of FIG. 8, the state machine 560 can be in one of four states: initial state 700, deferred state 720, backup state 740, and gross_xoff state 760. These states are described in more detail below. The state machine 560 is also able to assert the update signal 416 necessary for the values in the XON history register 420 to update the values in the XOFF mask 408.

The next header logic provides header information 409 (on FIG. 4) to the memory read module 350 so that it can extract the appropriate frame from the credit memory 320 for transmission into the crossbar fabric 140. More particularly, this header information 409 includes the destination SDA 582 for the frame, the read address location 584 of the frame in the credit memory 320, the priority 586 assigned to the frame by the inbound routing module 330, and a validity signal 588 that determines whether the header information 409 currently being provided by the next header logic 570 is valid.

7. States in the Queue Control Module 400 a) Initial State 700

Figure 9:
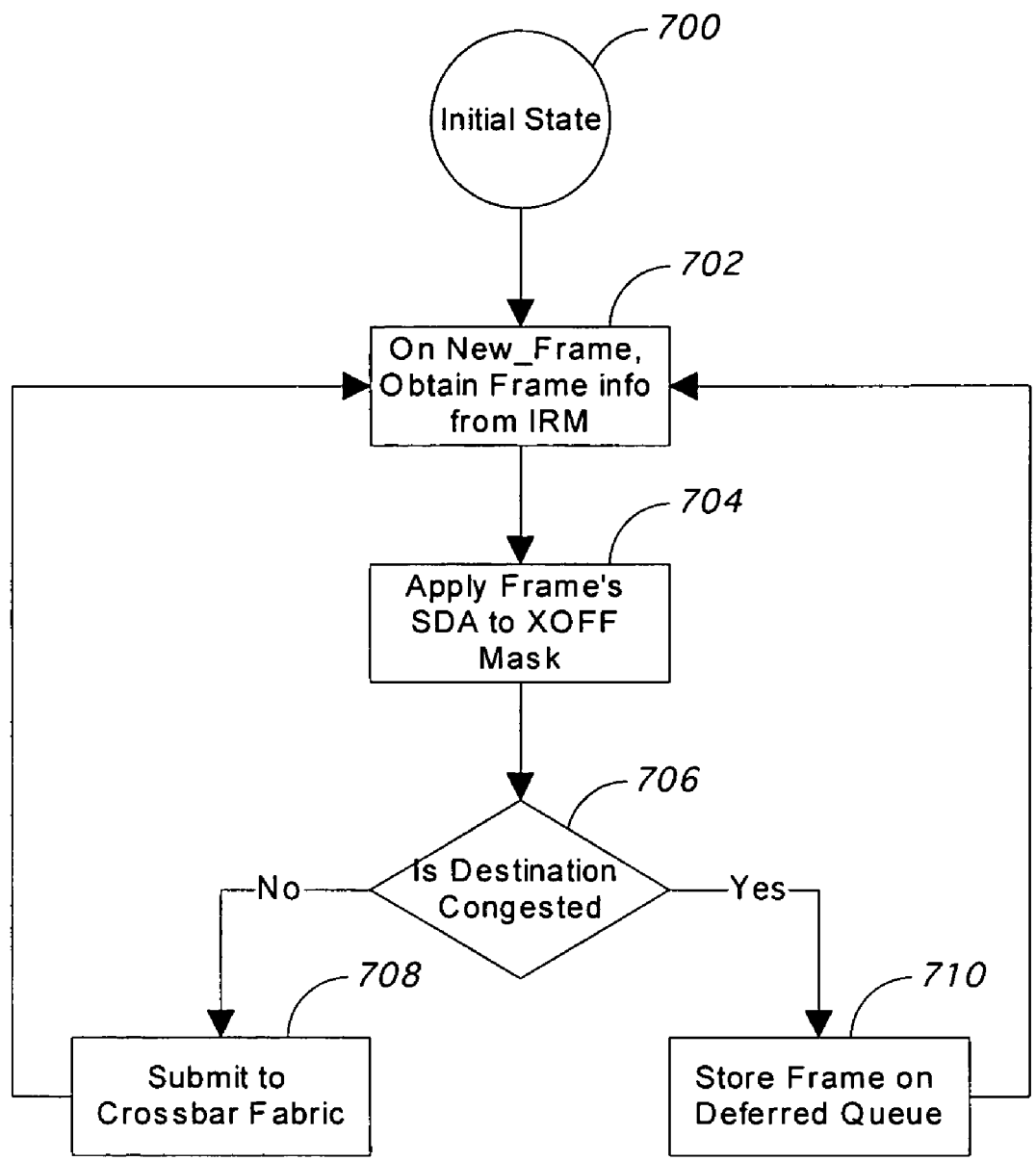
FIG. 9 is a flow chart showing the process used in the initial state of the header select logic of FIG. 7.

The queue module 400 begins in its initial state 700, which is shown in more detail in FIG. 9. When in this state 700, the queue module 400 is able to send incoming data packets directly to the crossbar fabric 140. Information about the incoming frame is presented to the queue control module 400 by the inbound routing module 330, which provides the frame's location in credit memory 320, its destination SDA, and its priority class assignment. When the IRM 330 asserts the new_frame signal 548, the queue control module 400 obtains this information in step 702. The SDA received from the routing module 330 is then presented to the XOFF mask 408 in step 704. If the XOFF mask 408 does not find the destination to be congested in step 706, the packet is submitted to the crossbar fabric 140 in step 708. If the destination is found to be congested in step 706, then the packet is placed in the deferred queue 402 in step 710. In both circumstances, control returns to step 702 where information about the next frame is then received from the routing module 330 and analyzed.

Figure 8:
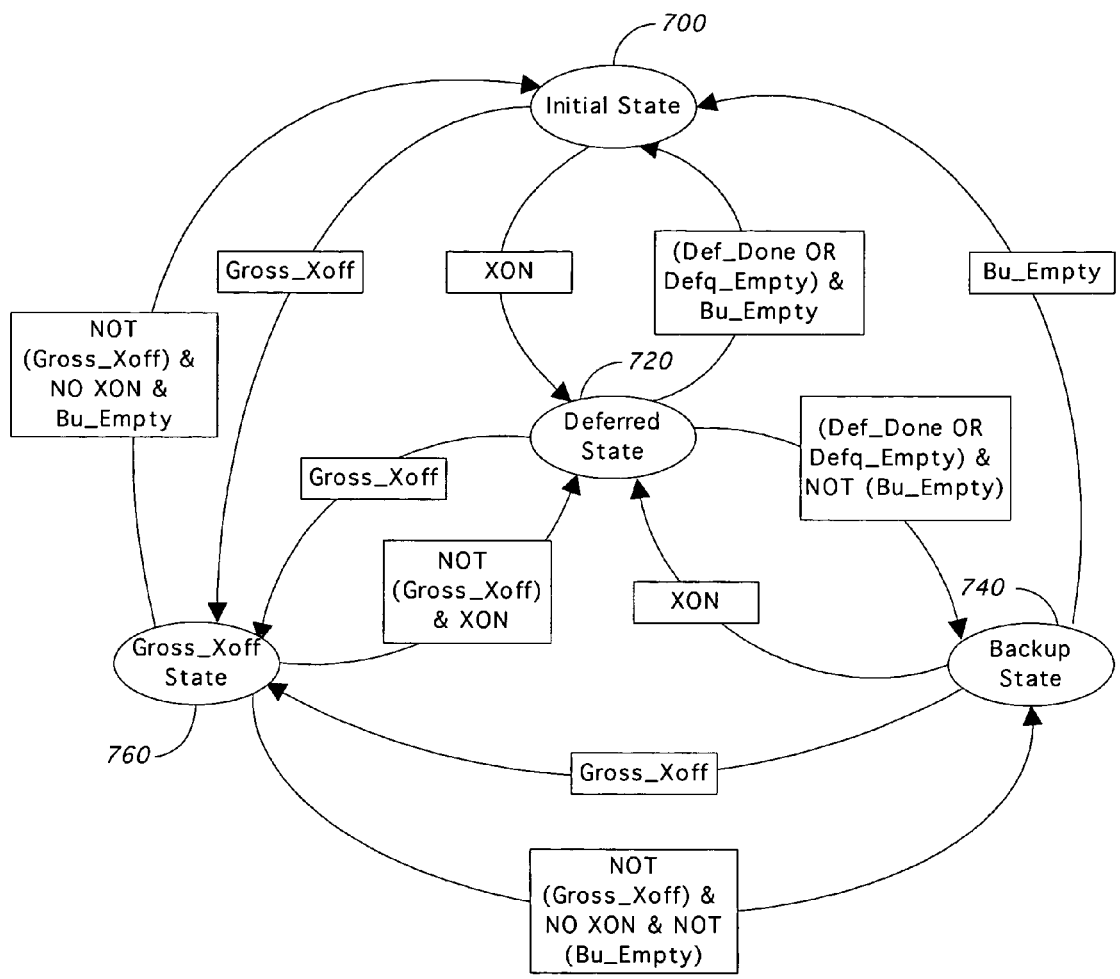
FIG. 8 is a state diagram for the state machine found in the header select logic of FIG. 7.

In this initial state 400, the queue control module 400 is able to send all incoming data frames either directly to the crossbar fabric 140 or to the deferred queue 402. As seen in FIG. 8, the state machine 560 remains in this initial state 700 until an XON event is received from the cell credit manager 440 on line 452, or a gross_xoff signal 522 is received from the FIM 160.

b) Deferred State 720

When the header select logic 406 notices an XON event 452 changing the congestion status of a port 110 from XOFF to XON, the state machine 560 enters the deferred state 720. At this point, the headers in the deferred queue 402 are examined to see if this change in congestion status will allow any of the previously deferred frames to be submitted over the crossbar fabric 140. Of course, if the deferred queue 402 is empty, there is no reason for the state machine 560 to enter the deferred state 720. Thus, the state machine 560 may choose to enter this state 720 only when the deferred queue 402 is not empty. This is true whether entering the deferred state 720 from the initial state 700, the backup state 740, or the gross_xoff state 760.

Figure 10:
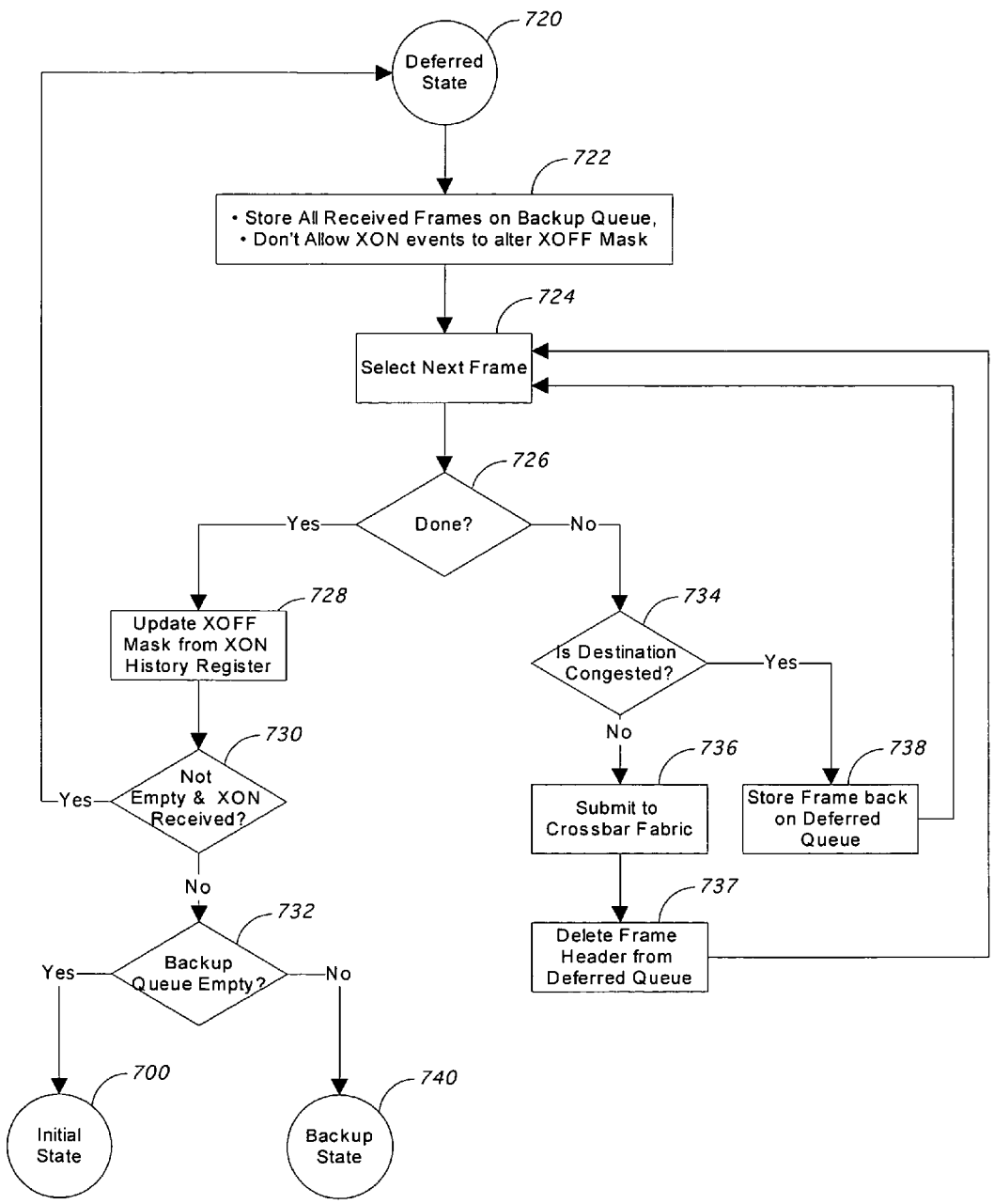
FIG. 10 is a flow chart showing the process used in the deferred state of the header select logic of FIG. 7.
Figure 11:
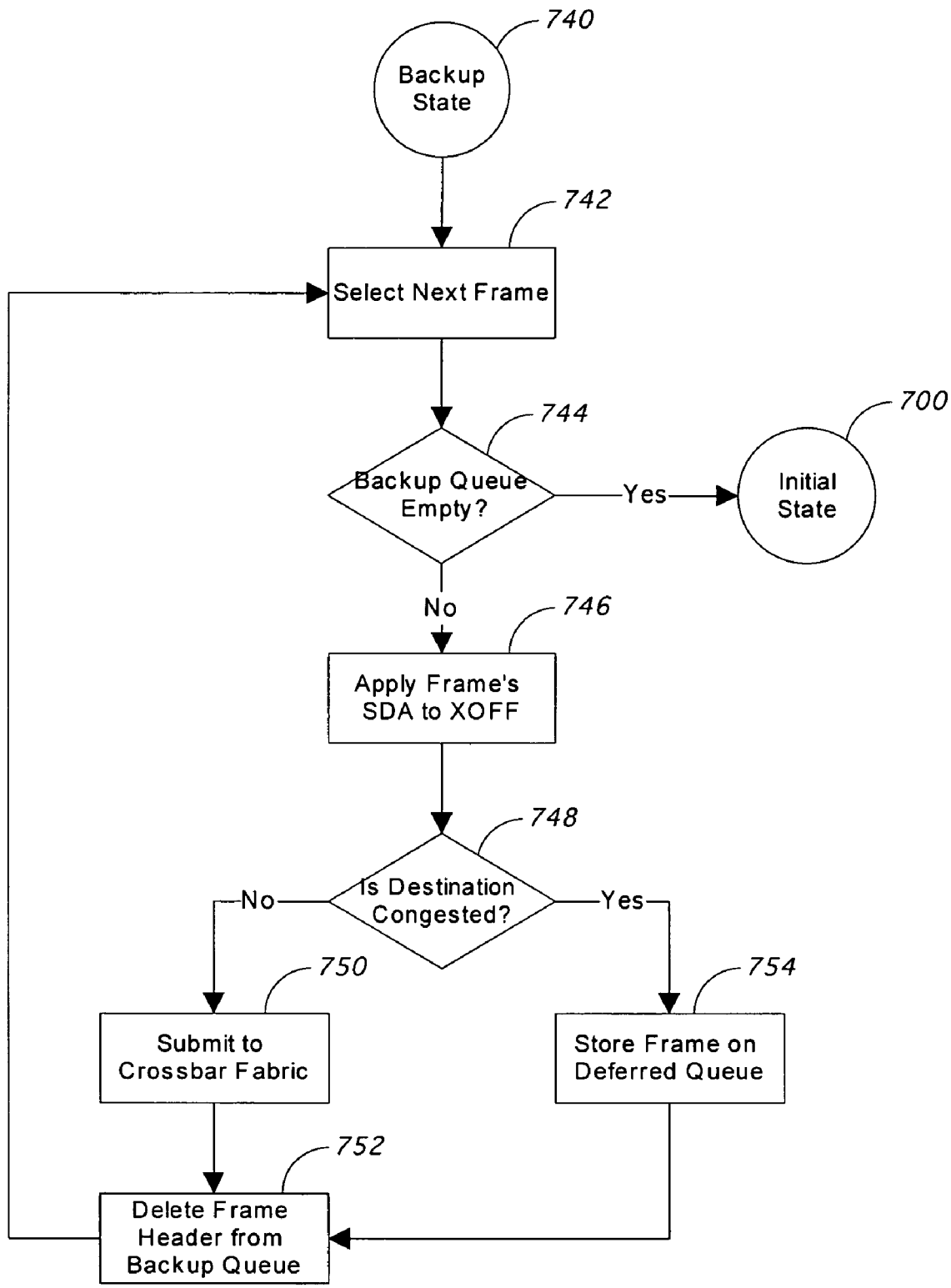
FIG. 11 is a flow chart showing the process used in the backup state of the header select logic of FIG. 7.

Once the state machine 560 enters the deferred state 720, two changes take place in the functioning of the queue control module 400, as shown in step 722 of FIG. 10. First, rather than analyzing the congestion status of all new frames received from the inbound routing module 330 (as was done in the initial state 700), new frames are now automatically placed on the backup queue 404. This ensures that previously deferred frames for a particular destination will be sent over the crossbar 140 before any later received frames for the same destination.

Second, the XOFF mask 408 is no longer updated with events that would change the state of a congestion port from XOFF to XON. This can be avoided by instructing the XOFF mask 408 to ignore such updates while in the deferred state 720, or by instructing the cell credit manager 440 to stop sending such signals to the XOFF mask 408. In a third alternative, the XOFF mask 408 can never change values from XOFF to XON unless the update 416 signal is asserted. In this latter case, all changes in the XOFF mask 408 from XOFF status to XON status pass through the XON history register 420. If a change in port status from XOFF to XON were allowed to take place during the middle of the examination of the headers in the deferred state 720, it would be possible for a frame at the end of the deferred queue 402 to be sent to a particular destination prior to a frame that was received earlier and is nearer the beginning of the deferred queue 402. This would be unacceptable. However, if the status of a port 110 changes during the deferred state 720 from XON to XOFF, that change is immediately reflected in the XOFF mask 408 and will take effect on the analysis of the next frame header in the deferred queue 402. If these XOFF status changes were not available immediately, the entire contents of the deferred queue 402 could possibly flood a destination port 114 that only had room for a single frame.

At step 724, the queue module 400 begins the process of analyzing all of the packet headers in the deferred queue 402 by selecting a frame header. Each time that the deferred state 720 begins, the review of frame headers starts at the top of the deferred queue 402 with the oldest frame header. At step 726, the queue module 400 ensures that it has not finished analyzing the entire queue 402. Assuming that not all frames in the queue 402 have been analyzed, step 734 compares the switch destination address for the selected frame with the current values in the XOFF mask 408 to determine whether that destination is still congested. If the destination port is not congested, the packet is submitted to the crossbar fabric 140 in step 736 and the frame header is deleted from the deferred queue 402 in step 737. If the destination is still congested, the packet is added back to the deferred queue 402 in step 738. In either case, the next frame in the deferred queue 402 is then selected and analyzed in step 724. When this operation is complete, all deferred headers that could not be serviced will have been written back into the deferred queue 402 in the same order that they were read out.

If the status of a switch port 110 changes during the deferred state 720 from XOFF to XON, that change is made to the XON history register 420 but not immediately to the XOFF mask 408. The examination of every header in the deferred queue 402 continues with the old XON status values in the XOFF mask 408. When this is completed, as determined by step 726, it is time to update the values in the XOFF mask 408. In step 728, the update signal 416 is asserted and the values in the XON history register 420 are applied to the XOFF mask 408 in step 730. Step 730 will then determine whether there had been any XON events during the deferred state 720 procedure. If so, and assuming the deferred queue 402 is not empty, it is necessary to re-examine the deferred queue 402 with the updated values in the XOFF mask 408. To accomplish this, the deferred state 720 is entered again, and the examination of all headers in the deferred queue 402 is repeated.

If any packets are received at the port 110 while the queue module 400 is in the deferred state, they are stored in the backup queue 404. When the deferred state has finished examining all headers in the deferred queue 402, and step 730 determines that no XON status events have been received, the queue control module will then check the status of the backup queue 404 in step 732. If the backup queue 404 is empty, the queue module returns to the initial state 700. If the backup queue 404 is not empty, the queue module enters the backup state 740.

c) Backup State 740

Frames are entered into the backup queue 404 during the deferred state 720 and the gross_xoff state 760. As shown in FIG. 8, the backup state 740 is entered after these two states 720, 760 are completed and data is found to exist in the backup queue 404. Alternatively, the initial state could check the status of the backup queue 404 and initiate the backup state 740 when necessary. In this alternative embodiment, the deferred state 720 and the gross_xoff state 760 would simply return control to the initial state 700 when completed.

The first step 742 of the backup state 740 is to select the first frame in the backup queue 404. Assuming that the backup queue 404 is not empty (step 744), the switch destination address for this frame will then be compared to the current status of the XOFF mask 408 in step 746. If the destination is not congested, as determined by step 748, the frame will be sent to the crossbar fabric 140 in step 750. The frame header will then be deleted from the backup queue 404 in step 752, and the next frame header will be selected again in step 742. If step 748 determines that the destination port is congested, the frame will be placed in the deferred queue 402 in step 754, and the process again returns to step 742.

If there is a change in the congestion status of any destination to an XON state, the queue control module 400 will immediately leave the backup state 740 enter the deferred state 720. However, if the queue module 400 completely empties the backup queue 404 in backup mode without any port changing to an XON status, as determined in step 744, the queue module 400 returns to the initial state 700.

d) Gross_XOFF State 760

Figure 12:
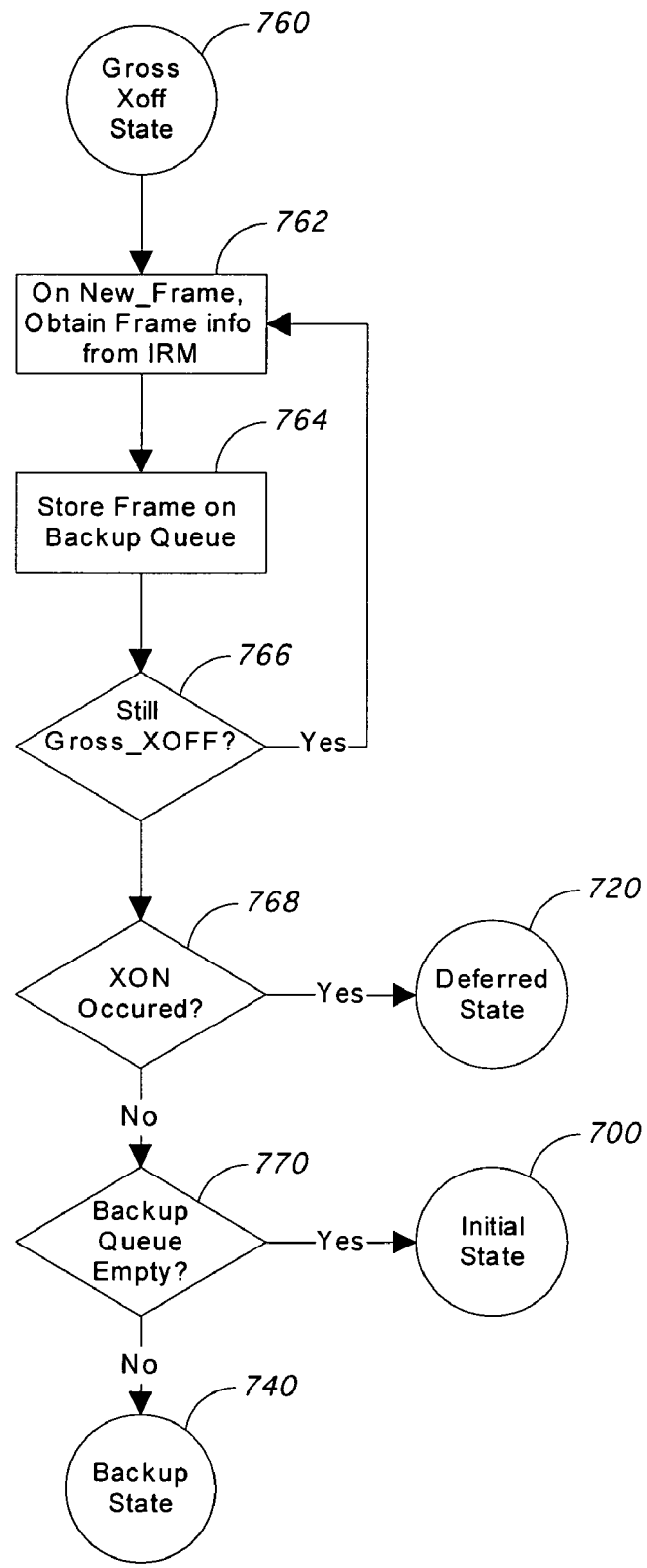
FIG. 12 is a flow chart showing the process used in the gross_xoff state of the header select logic of FIG. 7.

If a gross_xoff signal 522 is received, the input memory subsystem 180 supporting the crossbar fabric 140 cannot receive any additional data. The queue control module 400 immediately enters the gross_xoff state 760 regardless of the state it was in when the gross_xoff signal 522 was received (FIG. 8). During this state 760, new frame data can be received from the inbound routing module 330, as indicated by the new_frame signal 548. When this occurs, as shown in the flow chart of FIG. 12, frame information is obtained in step 762. This frame data is then stored on the backup queue 404 at step 764. If step 766 determines that the gross_xoff signal 522 is still set, the state 760 simple waits for more information to be received and stored in the backup queue 404 at steps 762 and 764. Assuming that step 766 determines that the gross_xoff signal 522 is no longer set, the queue control module 400 enters the initial state 700, the deferred state 720, or the backup state 740. Step 768 determines whether any XON events were received over XOFF event line 452 during the gross_xoff state 760. If so, and the deferred queue 402 is not empty, the queue control module is placed in the deferred mode 740. If not, step 770 determines whether the backup queue 404 is empty. If the backup queue 404 is empty, the queue control module is put in the initial state 700; otherwise the module 400 is put in the backup state 740.

It will be understood that the different embodiments of the present invention are not limited to the exact order of the above-described steps as the timing of these steps may be interchanged without affecting the overall operation of the present invention. Furthermore, the term "comprising" does not exclude other elements or steps, the terms "a" and "an" do not exclude a plurality and a single processor or other device may fulfill the functions of several of the units or circuits recited in the claims. In addition, although the above description of the present invention was made in the context of a Fibre Channel switch handling Fibre Channel frames, the present invention can be used with other data protocols. Consequently, the following claims will use the term "packet" generically to refer to units of data such as Ethernet frames, Fibre Channel frames, ATM cells, and the like.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for queuing packets in a switch comprising:
   a) storing a beginning of a first packet in a buffer;
   b) determining a switch destination for the first packet;
   c) determining a congestion status for the switch destination;
   d) forwarding the first packet to the switch destination if the congestion status is non-congested;
   e) storing the first packet in a deferred queue if the congestion status is congested;
   f) repeating the above steps, such that multiple packets that are routed to a plurality of different congested switch destinations are stored in the same deferred queue;
   g) entering a deferred state wherein the packets in the deferred queue are examined so as to send packets to their switch destination if their switch destination has a non-congested status;
   h) entering the deferred state when a first switch destination changes its congestion status from a congested state to a non-congested state; and
   i) when in the deferred state, storing packets received at the switch in a backup queue.

2. The method of claim 1, further comprising:
   j) entering a backup state wherein the packets in the backup queue are examined and sent to their destination or to the deferred queue.

3. The method of claim 2, wherein the step of entering the backup state further comprises:
   i) determining a switch destination for a first packet in the backup queue;
   ii) determining the congestion status for the switch destination of the first backup queue packet;
   iii) forwarding the first backup queue packet to its switch destination if the congestion status of its switch destination is non-congested; and iv) storing the first backup queue data packet in the deferred queue if the congestion status of its switch destination is congested.

4. The method of claim 3, further comprising:
k) entering a third state after receiving a signal that no data should be sent over a switch fabric of the switch, the third state causing all received data to enter the backup queue.

5. The method of claim 4, wherein the signal indicates that one of a plurality of ingress memory subsystem to the switch fabric is no longer accepting data, wherein said one ingress memory subsystem accepts packets stored in the buffer for submission over a switch fabric.

6. A data switch comprising:
a) an input port for receiving a data packet;
b) a buffer for temporarily storing and retrieving at least the beginning of the data packet;
c) destination determination logic for determining a switch destination for the data packet;
d) congestion status determination logic for determining a congestion status of the switch destination;
e) a deferred queue for storing header information relating to the data packet;
f) a queue controller for directing the data packet to the deferred queue if the congestion status is congested and for directing the data packet to the switch destination if the congestion status is non-congested;
g) deferred queue state logic for analyzing the packet on the deferred queue and for forwarding the packet to the switch destination if the congestion status has changed to non-congested; and
h) a backup queue for storing additional data packets when the deferred queue state logic is analyzing a packet.

7. A data switch that switches data packets through the switch from ingress ports to destination ports comprising:
a) a buffer memory at each ingress port for storing a portion of the data packets at known locations;
b) a routing module that determines switch destination addresses and other packet header information for the data packets;
c) a deferred queue and a backup queue for storing packet header information, including their locations in the buffer; and
d) a next header logic that selects a next data packet to be sent through the switch, the next data packet being chosen from incoming data packets analyzed by the routing module, the deferred queue, and the backup queue,
wherein the deferred queue is utilized for storing packet header information if the switch destination is congested, and
wherein the backup queue is utilized for storing packet header information if header information in the deferred queue is being analyzed.

8. The data switch of claim 7, further comprising:
e) a state machine having the following states
i) an initial state in which the header information received from the routing module is analyzed for transmission over the switch;
ii) a deferred state in which the header information in the deferred queue is analyzed for transmission over the switch; and
iii) a backup state in which the header information in the backup queue is analyzed for transmission over the switch.

9. The data switch of claim 8, further comprising:
f) a congestion status mask storing a congestion status for each switch destination address, wherein a first data packet is stored on the deferred queue when the switch destination address returned by the routing module for the first data packet has a congestion status of XOFF.

10. The data switch of claim 9, wherein the congestion status mask receives status updates changing the congestion status for the switch destination addresses.

11. The data switch of claim 10, wherein the deferred state is entered whenever the congestion status mask receives an XON update changing the congestion status for at least one switch destination address from XOFF to XON.

12. The data switch of claim 11, wherein data packet header information received from the routing module during the deferred state is stored on the backup queue.

13. The data switch of claim 12, wherein the backup state is entered after all of the header information in the deferred queue is analyzed in the deferred state.

14. The data switch of claim 13, wherein the backup state is only entered if the backup queue is not empty.

15. The data switch of claim 11, wherein the deferred state is exited after all of the header information in the deferred queue is analyzed in the deferred state.

16. The data switch of claim 15, wherein the congestion status mask does not update the congestion status of any switch destination address from XOFF to XON during the deferred state.

17. The data switch of claim 16, wherein all status updates from XOFF to XON received during the deferred state are stored in a register.

18. The data switch of claim 17, wherein the register updates the congestion status mask relating to congestion status changes from XOFF to XON after the deferred state is exited.

19. The data switch of claim 18, wherein the deferred state is re-entered immediately after the deferred state is exited if the XON history register updates the congestion status of any switch destination addresses.

* * * * *